Feb. 25, 1941.　　　O. G. HARNE　　　2,233,311
FISHING LINE WRINGER
Filed March 8, 1940
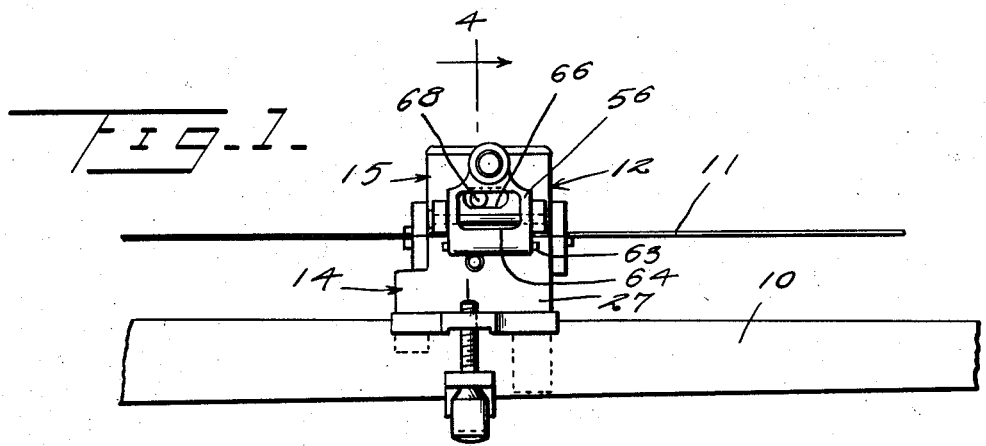
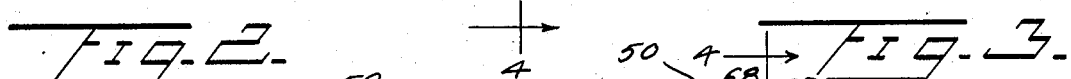
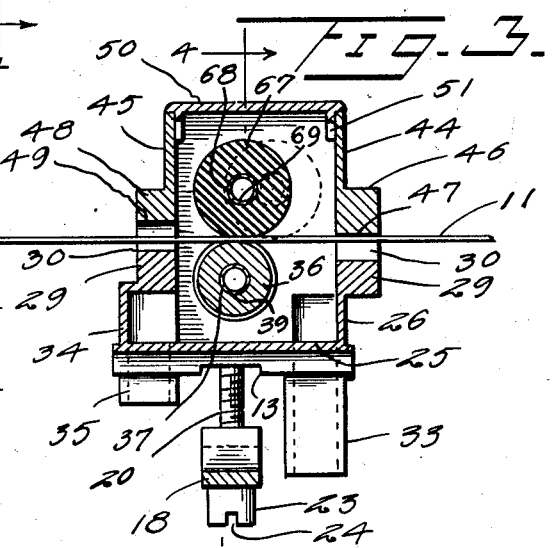
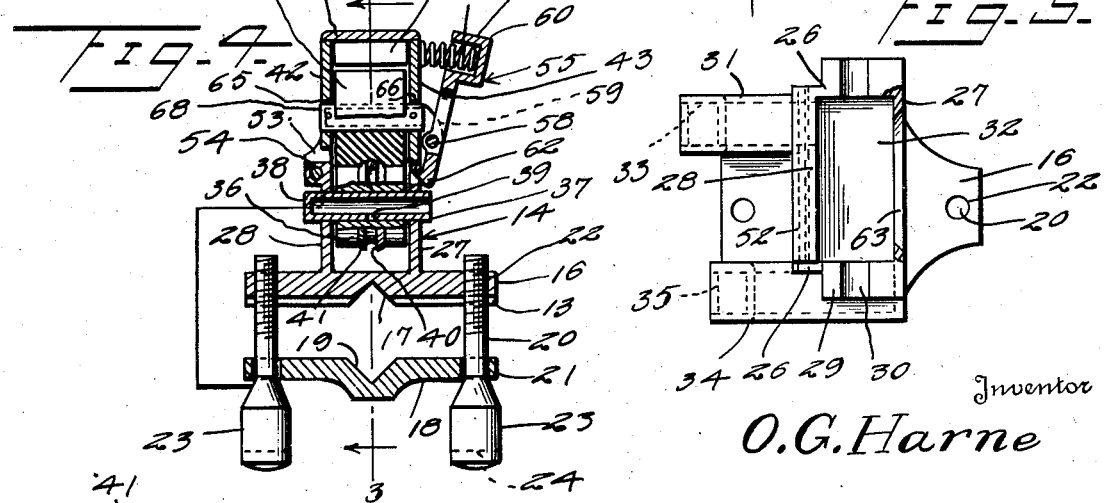
Inventor
O. G. Harne
By Kimmel & Crowell
Attorneys Patented Feb. 25, 1941

2,233,311

UNITED STATES PATENT OFFICE 2,233,311

FISHING LINE WRINGER

Oliver G. Harne, Baltimore, Md.

Application March 8, 1940, Serial No. 323,026

4 Claims. (Cl. 43—25)

This invention relates to wringing devices and more particularly to a device for wringing water out of a fish line as the line is being reeled in.

An object of this invention is to provide a wringer of this type which is adapted to be mounted on a fish pole forwardly of the reel.

Another object of this invention is to provide a device of this kind which will operate automatically as the line moves therethrough in one direction to wring water from the line, and which upon movement of the line therethrough in the opposite direction will automatically release the line so that the line may freely move in the opposite direction.

A further object of this invention is to provide a device of this kind which is of light weight and which includes a wringer housing formed with drain ports and passages so that the water will readily drain from the housing irrespective of the angle of the pole.

A still further object of this invention is to provide in a device of this kind, a pair of line wringing rollers, one of which is provided with a line guiding means so as to guide the line over the surface of the one roller and hold the line against movement lengthwise of this roller while the line is moving between the two rollers.

A further object of this invention is to provide an attachment for a fishing pole and which is adapted to be mounted on the pole forwardly of the reel which will prevent any back lash occurring in the line.

A further object of this invention is to provide an attachment for a fishing pole which will not only wring out the water absorbed by the line, but will also serve as a drag on the line as it is wound on the reel so that the line will be tightly wound on the reel.

A further object of this invention is to provide in combination with a fishing pole, a fishing line and a reel, a device engageable with the line and mounted on the pole which will permit free paying out of the line but which will automatically hold the line against rearward movement relative to the pole so as to thereby prevent tangling of the line about the pole and the guide eyes carried by the pole.

To the foregoing objects and to others which may hereinafter appear, the invention consists of the novel construction, combination and arrangement of parts as will be more specifically referred to and illustrated in the accompanying drawing wherein is shown an embodiment of the invention, but it is to be understood that changes, variations and modifications may be resorted to which fall within the scope of the invention as claimed.

In the drawing:

Figure 1 is a detail side elevation of a device constructed according to an embodiment of this invention mounted on a fish pole, the pole being shown in fragmentary form.

Figure 2 is an enlarged side elevation of the device on the side opposite from that shown in Figure 1.

Figure 3 is a sectional view taken on the line 3—3 of Figure 4.

Figure 4 is a sectional view taken on the line 4—4 of Figure 1.

Figure 5 is a top plan of the lower portion of the device with the lower roller removed from the roller housing.

Figure 6 is a fragmentary transverse section of the two rollers in operative position.

Referring to the drawing, numeral 10 designates generally a fish pole of suitable construction which at its inner end is provided with a reel (not shown) and a fish line 11 is engaged with the reel and passes through the conventional guiding eyes mounted on the pole 10.

In order to provide a means whereby the line 11 may have the water picked up by the line wrung out thereof as the line 11 is being reeled in, I have provided a wringer structure generally designated as 12. The wringer structure 12 comprises a lower housing member 14 and an upper housing member 15. The lower housing member 14 is provided with a pair of laterally projecting ears 16 which on their underside are provided with downwardly extending flanges 13. A pole seat 17 is formed in the center of the ears 16 and in the present instance, this seat is of substantially V-shape. The wringer structure 12 is mounted on the pole 10 at a suitable point forwardly of the reel conventionally provided for winding up the line 11, and the pole 10 is adapted to engage the seat 17 of the upper or fixed clamping structure 16.

A movable clamping bar 18 which is provided with a V-shaped seat 19 is adapted to engage below the pole 10 and a pair of screws 20 are loosely extended through openings 21 provided in the clamping bar 18 and are threaded into openings 22 formed in the ears or clamping member 16. The screws 20 are each provided with a head 23 which if desired may be formed with a kerf 24 so that a screw-driver or similar tool may be used to firmly clamp the wringer structure 12 on the pole 10.

The lower housing member 14 is formed with a bottom wall 25, end walls 26 and side walls 27 and 28. The end walls 26 are each provided an outwardly extending flange or body 29 in the upper surface of which a line guiding groove or passage 30 is formed. A draining duct 31 is connected at its inner end to the side wall 28 and communicates at its inner end with the chamber 32 formed within the walls 25, 26, 27 and 28. The draining duct 31 is provided with a right angular extension 33 which is open at its lower end so that the water draining out of the chamber 32 through the duct 31 will drop downwardly below the pole 10.

The duct 31 is connected to the forward end portion of the chamber 32 and a second draining duct 34 is connected to the rear end wall 26, communicating with the chamber 32. The opposite end of duct 34 is left open to prevent water trapping. A vertically disposed and depending extension 35 is connected at its upper end to the lower portion of the duct 34 and is adapted to carry off the water passing through the duct 34. The water is adapted to drain through the duct 34 from the chamber 32 when the forward end of the pole 10 is raised above the horizontal. When the forward end of the pole 10 is inclined below the horizontal, the water is adapted to drain through the duct 31 and the depending extension 33.

A lower line wringing roller 36 is rotatably disposed in the chamber 32 of the lower housing 14, the roller 36 being journalled on a tubular shaft 37 which extends between the side walls 27 and 28. One end of the tubular shaft 37 is open and the other end is closed by an end wall 38. The shaft 37 is provided with an oil hole or passage 39 in substantially the longitudinal center thereof and in the lower portion of the shaft 37 so that oil may be discharged into the open end of the fixed shaft 37, and this oil will flow through the passage 39 to the bore of the roller 36. The roller 36 in the longitudinal center thereof is provided with a line guiding groove 40 on the opposite sides of which a pair of ribs 41 are disposed which are raised from the periphery of the roller 36.

The ribs 41 together with the groove 40 provide a means whereby the line 11 will be guided over the center of the lower roller 36. The upper housing member 15 comprises a pair of side walls 42 and 43 and a pair of end walls 44 and 45. The end wall 44 is provided with a forwardly extending lug or extension 46 in the lower surface of which a groove 47 is formed which is adapted to confront a groove 30 in a forward ear or extension 29. The rear wall 45 is provided with a rearwardly extending lug or extension 48 which has formed in the lower surface thereof, a groove 49 confronting a rear groove 30 of a rear extension 29.

A top wall or lid 50 is removably mounted on the upper housing member 15 and is provided with a pair of depending resilient clips or holding members 51 which are adapted to engage the inner surface of the end walls 44 and 45. The side wall 28 of the lower housing 14 has formed in the upper portion thereof a hinge barrel 52 and the upper housing 15 is provided with a pair of laterally projecting ears 53 which are carried by the housing 15 and extend laterally of the side wall 42. A pintle 54 engages through the ears 53 and through the hinge barrel 52 so as to swingably mount the upper housing member 15 on the lower housing 14. A spring pressed latch generally designated as 55 is carried by the upper housing member 15 and comprises a plate 56 formed with a knob 57 at its upper end. The plate 56 is pivotally mounted on a shaft 58 which engages through ears 59 carried by the side wall 43. The knob 57 is provided with a socket 60 within which one portion of a spring 61 engages. The spring 61 abuts against the side wall 43 and constantly urges the latch 55 to a locked position.

The latch 55 is provided with a bill 62 at its lower end which is adapted to engage in a keeper slot 63 which is formed in the side wall 27 of the lower housing 14.

The plate 56 is formed with an elongated and relatively large opening 64, and the side walls 42 and 43 are each formed with elongated shaft guiding slots 65 and 66, respectively. The slot 66 lies substantially within opening 64 of the latch member 55. A second wringer roller 67 is secured to a shaft 68 which is loosely mounted in the two elongated slots 65 and 66. The slots 65 and 66 are elongated horizontally lengthwise. The roller 67 is preferably a soft roller, being formed out of rubber or other yieldable material and when the roller 67 is in an inoperative position, the shaft 68 is adapted to engage the forward ends of the two slots 65 and 66 with the periphery of the roller 67 out of contact with the lower roller 36.

The lower roller 36 is a hard roller and may be formed out of metal or other suitable hard material.

In the use and operation of this device, the wringer member 12 is adapted to be secured by means of the clamping bar 18 and the clamping screws 20 on the pole 10 at a position forwardly of the reel, the wringer structure 12 being preferably positioned fairly close to the reel. Preferably the wringer structure 12 is positioned between the last two guide eyes carried by the pole 10 so that when the line is being withdrawn from the reel and is moved outwardly through the guide eyes, the wringer structure comprising the two rollers 36 and 67 will not exert any pressure or friction on the line. When the line is moving outwardly, the upper pressure roller 67 will be disposed in the dotted position shown in Figure 3.

In this position the shaft 68 will be at the forward ends of the two shaft guiding slots 65 and 66 and the periphery of the roller 67 will be out of contact with the ribs 41 carried by the lower roller 36. The fish line is adapted to engage in the groove 40 formed in the lower roller 36 which groove together with the ribs 41 will guide the fish line in its movement in either direction through the wringer member 12.

When it is desired to reel in the fish line 11, the reel is operated in the usual manner and as the line 11 moves toward the rear or handle end of the pole 10, the friction between the line 11 and the pressure roller 67 will cause this roller to move rearwardly and to engage the periphery of the roller 36. In this position the shaft 68 of the roller 67 will be substantially above the stationary shaft 37 of the roller 36. The roller 67 is of such a diameter that this roller will first contact with the lower roller 36 when the shaft 68 is substantially in the transverse center of the slots 65 and 66. The pressure exerted on the line 11 by the two rollers 36 and 67 will wring out a considerable amount of water absorbed or carried by the line 11 and this water will flow into the lower chamber 32 of the lower housing 14.

In the event the forward end of the pole 10 is raised above the horizontal, the water in the chamber 32 will flow through the rear duct 34 and outwardly of the end of the duct 34 or through the extension duct 35. In the event the forward end of the pole 10 is below the horizontal, the water in the chamber 32 will flow forwardly of the lower housing 14 and will drain out of the chamber 32 through the forward duct 31 and the extension duct 33.

The wringer structure hereinbefore described will automatically wring the line as the line is being reeled in due to the friction between the line and the upper movable roller 67. Where the line is being cast or moves outwardly from the reel, the friction of the line 11 will pull the roller 67 forwardly until the shaft 68 engages the forward ends of the guiding slots 65 and 66. At this time, the movable roller 67 is out of contact with the lower roller 36. If desired during the casting of the line, the upper housing 15 may be swung to a released or open position by pressing the knob 57 inwardly so as to release the latch 55 from the keeper 63.

The shaft 68 may be readily oiled by applying the oil in the slots 65 and 66 or in one end of the shaft 68, the shaft 68 being hollow and open at one end and provided with oil holes 69. The oil for the slot 66 may be passed through the slot 64 in the latch plate 56. The roller 36 may be lubricated by discharging the oil or lubricant in the open end of the hollow stationary shaft 37 so that this lubricant may enter the shaft 37 and flow through the opening 39 in this shaft so as to engage the bore of the roller 36.

This wringer structure can be made out of light material so that it will not add unduly to the weight of the fish pole and may be left on the pole at all times. From actual experiments it has been found that this wringer structure will remove practically all of the free water on the fish line, the amount of free water removed being in excess of the amount remaining absorbed by the line. In this manner the fish line will dry out more quickly than is the case where a wringer structure is not used. The two rollers 36 and 67 are of such a size and the groove 40 in the roller 36 is of such a size that a number of different sizes or diameters of fish line may be used with a single wringer structure. Where the fish line is too small to have the water wrung out therefrom by the two rollers 36 and 67, these rollers may be replaced by one or more rollers having a more shallow groove and possibly of different diameters so as to compress the line 11 to the desired degree in order to wring out all of the free water.

What I claim is:

1. In combination, a fishing pole, a fishing line, and automatically operable means mounted on the pole and engaging the line for retarding the movement of the line in one direction while permitting free movement of the line in the opposite direction.

2. In combination a fishing pole and a fishing line, and automatically operable means mounted on the pole and engaging the line for exerting a drag on the line as the line moves in one direction, said means providing for automatically releasing the line for free movement in the opposite direction.

3. A combined fishing line wringer and drag structure for mounting on a fishing pole comprising a supporting means, a pair of rollers carried by said supporting means, means fixed relative to said supporting means rotatably mounting one of said rollers on said supporting means, and a shaft fixed to the other roller, said supporting means having a pair of spaced parallel horizontally elongated lengthwise guide means for said shaft whereby said other roller will be automatically shifted into contacting relation with said one roller upon movement of the line therebetween in one direction, and said other roller will be automatically shifted out of contact with said one roller upon movement of the line in the opposite direction.

4. In a combined fishing line wringer and drag structure for mounting on a fishing pole, a housing having means for clamping it upon the pole in encompassing relation with respect to the line, a rotatable lower roller arranged within the lower portion of the housing below the line and disposed on a stationary axis, a rotatable upper roller arranged in the upper portion of the housing above the line for correlation with the other roller and disposed on a horizontally slidable rotatable shaft, a forward drain depending from and opening into the housing, and a rear drain depending from, spaced from said other drain and opening into the housing, each of said drains being of inverted L-shaped contour and including a horizontal upper leg having depending from one end thereof a vertical leg, one end of each of said horizontal legs being closed, the other end of one of said horizontal legs being open.

OLIVER G. HARNE.